United States Patent [19]

Morinigo et al.

[11] Patent Number: 5,355,108
[45] Date of Patent: Oct. 11, 1994

[54] ELECTROMAGNETICALLY ACTUATED COMPRESSOR VALVE

[75] Inventors: Fernando B. Morinigo, Los Angeles; Keith O. Stuart, Cypress, both of Calif.

[73] Assignee: Aura Systems, Inc., El Segundo, Calif.

[21] Appl. No.: 988,280

[22] Filed: Dec. 9, 1992

Related U.S. Application Data

[63] Continuation-in-part of Ser. No. 957,194, Oct. 5, 1992.

[51] Int. Cl.$^5$ .................. H01F 3/00; H01F 7/08; H01F 7/12; F16K 31/02
[52] U.S. Cl. .................................. 335/262; 335/279; 335/281; 335/249; 251/129.15
[58] Field of Search .............. 335/261, 262, 263, 279, 335/281, 249; 251/129.16, 129.1; 123/90.11

[56] References Cited

U.S. PATENT DOCUMENTS

| | | | |
|---|---|---|---|
| 750,132 | 1/1904 | Timmis | 335/261 |
| 1,582,986 | 5/1926 | Harris | 335/261 |
| 1,870,753 | 8/1932 | Sachs | 335/261 |
| 3,054,935 | 9/1962 | Fisher | 335/261 |
| 3,858,135 | 12/1974 | Gray | 335/266 |
| 4,308,794 | 1/1982 | Adamoli | 101/93.03 |
| 4,491,816 | 1/1985 | Blum | 335/245 |
| 4,525,695 | 6/1985 | Sheng | 335/262 |
| 4,553,121 | 11/1985 | Logie | 335/261 |
| 4,604,600 | 8/1986 | Clark | 335/261 |
| 4,605,918 | 8/1986 | Lemarquand | 335/261 |
| 4,912,929 | 4/1990 | Beale et al. | |
| 4,928,028 | 5/1990 | Leirovich | |
| 5,131,624 | 7/1992 | Kreuter | 251/129.18 |
| 5,222,714 | 6/1993 | Morinigo | 251/129.16 |

FOREIGN PATENT DOCUMENTS

| | | | |
|---|---|---|---|
| 38880 | of 0000 | Fed. Rep. of Germany | 335/279 |
| 2717120 | 11/1978 | Fed. Rep. of Germany | 335/261 |
| 1040670 | 9/1966 | United Kingdom | 335/281 |
| 2047006 | 11/1980 | United Kingdom | 335/279 |
| 2077045 | 12/1981 | United Kingdom | 335/262 |

*Primary Examiner*—Leo P. Picard
*Assistant Examiner*—Stephen T. Ryan
*Attorney, Agent, or Firm*—Anthony T. Cascio; Lisa A. Clifford

[57] ABSTRACT

A compressor having an electromagnetically actuated valve is disclosed. The movement of the compressor's piston is controlled by an electromagnetically actuated valve. The valve includes an electromagnetic element having a core and a coil, and an armature. The core has a surface and an opening at the surface extending through the core. The surface also includes a continuous channel extending around the opening. The channel has a top portion of frustroconical cross-section and a bottom portion. The coil is disposed in the bottom portion. The armature element has a raised portion dimensioned to be received within the top portion of the channel. The valve shaft is disposed within the opening of the electromagnetic element and is connected to the armature. The compressor piston is connected to one end of the shaft. A support spring is disposed within the opening of the electromagnetic element, and extends from the retaining bar to the upper surface of the cylinder. Two lower springs extend from the armature element to a lower support surface. The springs bias the armature in a normally spaced apart relationship from the electromagnetic element. Therefore, applying current to the coil in the electromagnetic element causes the piston to move upward, and interrupting the current to the coil causes the piston to move downward.

13 Claims, 1 Drawing Sheet

ELECTROMAGNETICALLY ACTUATED COMPRESSOR VALVE

RELATED APPLICATION DATA

The present application is a continuation-in-part of commonly owned, co-pending application, U.S. Ser. No. 07/957,194, filed on Oct. 5, 1992 for Electromagnetically Actuated Valve, which is incorporated by reference herein.

FIELD OF THE INVENTION

The present invention relates generally to an electromagnetically actuated valve, and more particularly to an electromagnetically actuated compressor valve which creates linear motion directly.

BACKGROUND OF THE INVENTION

One basic problem with a standard refrigerator compressor is the inefficiency of the compressor due to the friction generated by the piston drive mechanism in the standard compressor. A standard refrigerator compressor uses an induction motor to rotate a crankshaft, which in turn moves a piston up and down within a compression chamber. Referring to FIG. 1, a typical refrigerator compressor 10 is shown. More specifically the induction motor 12 creates a torque on the crankshaft 14 which causes the piston 16 to move back and forth within the cylinder 18 via a connecting rod 20. During operation, the force exerted by the compressing gas is transferred through the piston's spherical bearing 22 down the connecting rod 20 to the connecting rod bearing 24 and finally to the crankshaft bearings 26. These bearings are all heavily side loaded creating a great amount of friction. As a result, the bearings must be continuously lubricated.

Therefore, a need exists for a compressor valve that provides the required piston movement without producing undesired amounts of friction.

Another problem with the standard compressor is that its manufacturing process is complex, and therefore relatively expensive. The conventional induction motor in the compressor is constructed from a laminated stack of silicon-iron, with a copper coil complexly woven throughout. The motor's stator is assembled by stamping appropriately-shaped individual laminates from a coiled sheet silica-iron. The laminates are varnished, stacked in a jig, and welded along the side to create one integral unit. Coil slots and holes are machined into the stacked assembly, and plastic insulation inserts are placed in the slots and holes. Copper wire is then woven into the inserts by a coil winding machine. The coil extensions are then machine stitched, the entire assembly vacuum impregnated with epoxy, and baked. Similarly, the conventional compressor's rotor assembly requires stacked laminates, wherein the process of stacking is identical to that required for the stator.

The standard compressor further requires three precision bushings and a complex spherical bearing. These parts require precision grinding and hardened materials to provide the requisite durability. Therefore, the manufacturing process of the conventional compressor requires extensive equipment and processing, and is therefore a costly process. In comparison, in the compressor of the present invention, the manufacturing process is simple, does not require the above-discussed complex manufacturing process, and only requires precision grinding for the piston and cylinder. Furthermore, the compressor of the present invention uses considerably less copper wire than the typical compressor, and therefore is less expensive in material costs.

Therefore, a need also exists for a compressor that is inexpensive and relatively simple to manufacture.

SUMMARY OF THE INVENTION

Accordingly, it is a primary object of the present invention to overcome one or more disadvantages and limitations of the prior art.

A significant object of the present invention is to provide an electromagnetic compressor valve that does not require rotary bushings.

Another object of the present invention is to provide an electromagnetic compressor valve that translates linear motion into linear motion.

Another object of the present invention is to provide electromagnetic compressor valve that allows valve operation at higher speeds and higher frequency than the prior art.

It is yet another object of the present invention to provide a compressor that is inexpensive and relatively simple to manufacture.

According to a broad aspect of the present invention, a compressor wherein the movement of the compressor's piston is controlled by an electromagnetic actuator comprising an electromagnetic element having a core and a coil, and an armature. The core has a first surface and an opening at the first surface extending through the core. The first surface also includes a continuous channel extending around the opening. The channel has a top portion of frustroconical cross-section and a bottom portion. The coil is disposed in the bottom portion. The armature element has a raised portion dimensioned to be received within the top portion of the channel. The valve shaft is disposed within the opening of the electromagnetic element and is connected to the armature. The compressor piston is connected to one end of the shaft. A support spring is disposed within the opening of the electromagnetic element, and extends from the retaining bar to the upper surface of the cylinder. Two lower springs extend from the armature element to a lower support surface. The springs bias the armature in a spaced apart relationship to the electromagnetic element. Therefore, applying current to the coil in the electromagnetic element causes the piston to move upward, and interrupting the current to the coil in the upper electromagnetic element causes the piston to move downward.

A feature of the present invention is that the design of the electromagnets provide sufficient electromagnetic strength to overcome the force of the compressed gas in the compressor.

Another feature of the present invention is that the electromagnetically actuated valve directly produces linear piston movement in the compressor.

Yet another feature of the present invention is that amount of friction produced by the piston movement in the compressor is greatly reduced from the prior art by the use of the electromagnetically actuated valve.

Still another feature of the present invention is that the compressor includes vibration cancellation.

These and other objects, advantages and features of the present invention will become readily apparent to those skilled in the art from a study of the following description of an exemplary preferred embodiment when read in conjunction with the attached drawing and appended claims.

DESCRIPTION OF AN EXEMPLARY PREFERRED EMBODIMENT

Figure 1:
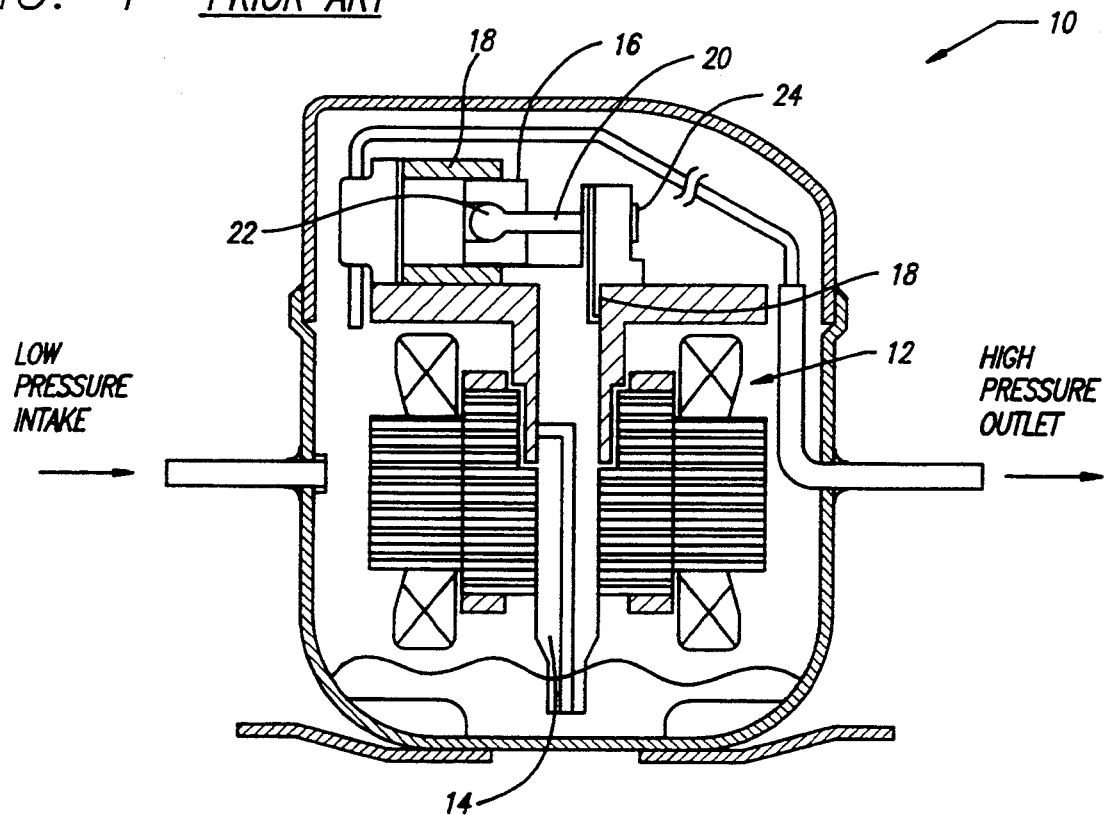
FIG. 1 is a cross-sectional view of a prior art refrigerator compressor valve.
Figure 2:
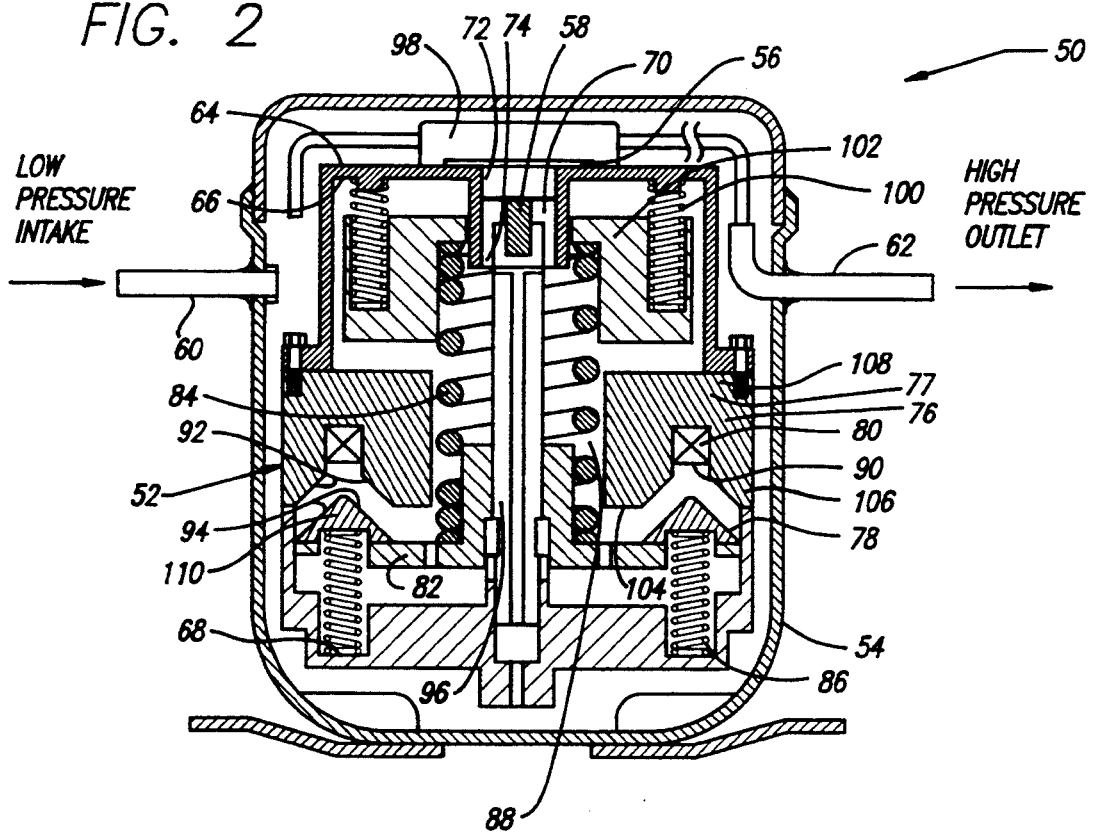
FIG. 2 is a cross-sectional view of one embodiment of the compressor valve of the present invention.

Referring now to FIG. 2, one embodiment of a compressor 50 with an electromagnetically actuated valve 52 is shown in cross-section. In the embodiment shown, the compressor 50 includes a compressor containment can 54, a compression cylinder 56, a piston 58, and the electromagnetically actuated valve 52 for controlling the movement of the piston 58 in the compressor 50.

The containment can 54 includes a low pressure intake port 60, a high pressure outlet port 62, and a reed valve 98. The cylinder 56 is disposed within the containment can 54, and includes a cylinder cover 64. The cylinder 56 provides an upper support surface 66 and a lower support surface 68. The upper support surface 66 defines a preferably cylindrical aperture 70, within which the piston 58 is disposed. The aperture 70 also defines an aperture upper end 72 and an aperture lower end 74. The electromagnetically actuated valve controls the movement of the piston 58 between the upper end 72 and the lower end 74 of the aperture 70.

The electromagnetically actuated valve 52 includes an electromagnetic element 76, including a core element 77 and a coil 80, an armature element 78, a retaining bar 82, a valve shaft 96, a support spring 84, and at least one lower spring 86. The core 77 of the electromagnetic element 76 has a first face 104, with an opening at the first face 104 that extends through the core element to define a central chamber 88. I he electromagnetic element 76 preferably has annular horizontal cross-section. The first face 104 of the core element 77 further includes a central channel 90 that extends around the central chamber 88.

In an alternative embodiment of the invention, the electromagnetic element 76 may be toroidal-shaped, and extend annularly around the valve shaft 96, or have a substantially U-shaped vertical cross-sectional area. The electromagnetic element 76 therefore defines two open polar faces 92 which provide a large electromagnetic pole face area. This alternative configuration is explained in detail in co-owned U.S. patent application Ser. No. 07/957,194, filed on Oct. 5, 1992, now U.S. Pat. No. 5,222,714, which has been incorporated by reference herein.

Referring still to FIG. 2, in the embodiment shown, the central channel 90 has a top portion 106 preferably of a frustroconical cross-section, and a bottom portion 108. The frustroconical top portion defines two polar faces 92 of the electromagnetic element 76 extending from the channel 90, each of the polar faces extending at a pre-selected angle. The armature element 78 also preferably has an annular horizontal cross-section. The armature 78 has a raised portion 110 that is dimensioned to fit in the top portion 106 of the channel 90. The armature raised portion defines two armature pole faces 94, which are at an armature pole face angle corresponding to the pre-selected electromagnet angle. The armature pole faces 94 are angled for maximum contact with the electromagnetic element 76. The angle of the pole faces relative to the stroke motion of the valve serves to reduce the amount of current required to pull the valve from an open to closed position, and vice versa. The angle of the electromagnetic pole faces 92 and armature pole faces; 94 are also selected so as to provide a polar surface that provides adequate electromagnetic force to match the force that is exerted by compressing gas on the piston during the compression cycle. The process of calculating the required values for the angles of the polar faces and other dimensions dimensions is explained in detail in co-owned U.S. patent application Ser. No. 07/957,194, filed on Oct. 5. 1992, now U.S. Pat. No. 5,222,714, which is incorporated by reference herein.

The coil 80 extends within the bottom portion 108 of the central channel of the electromagnetic element and is bonded to the electromagnetic element. The central location of the coil element and the cross-sectional shape of the electromagnetic element provides maximized magnetomotive force, with minimal resistance, and therefore maximum power. The valve shaft 96 is disposed within the central chamber 88 of the electromagnetic element 76. The piston 58 is connected to one end of said sin aft 96. The retaining bar 82 connects the armature element 78 to the valve shaft 96. Therefore, the piston 58, valve shaft 96, and armature element 78 combine to form a moving assembly.

The support spring 84 is disposed within the central chamber 88 of the electromagnetic element 76 and extends from the retaining bar 82 or armature 78 to the upper support 66 within the compression cylinder 56. Therefore, the support spring 84 restrains the armature 78 from upper movement. In the embodiment shown, two lower springs 86 extend from the armature element 78 or retaining bar 82 to the lower support surface 68 of the cylinder 56. The lower springs restrain the armature 78 from downward movement.

Referring still to FIG. 2 the operation of the compressor 50 will be described. The support spring 84 and the lower springs 86 bias the armature in its initial spaced apart position from the electromagnetic element. In order to close the valve, and raise the piston 58 to the upper end 72 of the aperture 70, the electromagnet 76 is energized by applying current to the coil 80, creating an electromagnetic field. The electromagnetic field attracts the armature 78 towards the electromagnet 76. Because the armature 78 is attached to the piston 58 via the retaining bar 82 and shaft 96, the movement of the armature 78 towards the electromagnet 76 moves the piston 58 in the aperture 70 toward the aperture, upper end 72. The upward movement of the armature 78 also causes the compression of the support spring 84, thereby storing energy in the support spring 84.

When the piston 58 reaches the uppermost position in the aperture 70, the current in the coil 80 is interrupted, and the moving assembly, consisting of the piston 58, shaft 96, and armature 78, are forced downward by the energy stored in the support spring 84. The momentum of the moving assembly causes it to drive past in its initial open position, and compress the lower spring 86. The lower springs 86 therefore slows and eventually stops the downward movement of the moving assembly. As the piston is moving downward, refrigeration gas is drawn into the compression chamber through the intake valve 60 and reed valve assembly 98.

After the lower springs 86 stop the downward movement of the moving assembly, the compressed lower springs 86 drive the moving assembly upward, past its initial point and toward the top of its stroke. As the piston 58 moves upward in the aperture 70 the pressure increase in the compression chamber causes the intake valve to close, and the compression of the gas begins. Initially, the amount of force required to compress the gas is low. However, as the piston moves upward in the aperture, the amount of force required increases, and it therefore becomes necessary to apply external energy to the compression cycle in order to drive the piston to its uppermost position. The external energy is applied by energizing the electromagnet 76, as described above. The size and shape of the electromagnet is designed such that the amount of electromagnetic force generated matches line restricting force generated by the compressed gas, so as to allow the piston to reach its uppermost position. Once the piston reaches its uppermost position, the current to the coil element is interrupted, the moving assembly is driven downward by the compressed support spring 84, and the cycle is repeated.

An addition feature of the present invention is the vibration cancellation system of the compressor. As shown in FIG. 2, the compressor includes two upper springs 100 and a spring mounted reaction mass 102. The compression and extension of the support spring 84 drives the reaction mass 102 180 degrees out-of phase with the moving assembly. The matching of the weight of the reaction mass 102 to the weight of the moving assembly causes the natural and nearly complete cancellation of rectilinear vibrations. Any remaining small amounts of vibration are eliminated by mounting the compressor assembly to springs within the housing, and rubber-mounting the entire compressor unit to the refrigerator frame.

It should be noted that in an alternative embodiment of the invention, more than one electromagnetic element and armature element may be used. The use of multiple electromagnetic element and armature pairs is significant in that it reduces the mass required to complete the magnetic circuit, without reducing the area allocated for the flux. Therefore, although the current and power requirements will increase with multiple electromagnet pairs and armatures, the total current and power requirement remains desireably manageable.

There has been described hereinabove an exemplary preferred embodiment of the actuator according to the principles of the present invention. Those skilled in the art may now make numerous uses of, and departures from, the above-described embodiments without departing from the inventive concepts disclosed herein. Accordingly, the present invention is to be defined solely by the scope of the following claims.

I claim as my invention:

1. An electromagnetic actuator for actuating an external load comprising:
    an electromagnetic element, said electromagnetic element including a core and a coil, said core having a first surface and an opening at said first surface extending through said core, said first surface further having a continuous channel extending around said opening, said channel having a top portion of frustoconical cross-section and a bottom portion, said coil being disposed in said bottom portion; and
    an armature element, said armature element having a raised portion of frustoconical cross-section dimensioned to be received within said top portion of said channel, said armature further being in a normally biased initial spaced apart position from said electromagnetic element, said armature being connected to the external load;
    wherein applying current to the coil in the electromagnetic element causes the armature to move toward the electromagnetic element, and interrupting the current to the coil causes the armature to move away from the electromagnetic element.

2. An electromagnetic actuator in accordance with claim 1 further comprising a support spring, said support spring disposed within the opening of the electromagnetic element and biasing said armature in the spaced apart position.

3. An electromagnetic actuator in accordance with claim 2 further comprising at least one lower spring, said lower spring contacting said armature and serving to bias the armature in an opposing direction from said support spring.

4. An electromagnetic actuator in accordance with claim 1 wherein said electromagnetic element and said armature are annular in horizontal cross-section.

5. An electromagnetic actuator in accordance with claim 3 wherein two lower springs are used, each of said two lower springs being disposed on opposing sides of the opening of the armature element.

6. An electromagnetic actuator in accordance with claim 1 further comprising a shaft, said shaft connecting said armature element to the external load.

7. An electromagnetic actuator for actuating an external load comprising:
    an electromagnetic element, said electromagnetic element including a core and a coil, said core having a first surface and an opening at said first surface extending through said core, said first surface further having a continuous channel extending around said opening, said channel having a top portion of frustoconical cross-section and a bottom portion, said coil being disposed in said bottom portion;
    an armature element, said armature element having a raised portion of frustoconical cross-section dimensioned to be received within said top portion of said channel, said armature further being in a normally biased initial spaced apart position from said electromagnetic element, said armature being connected to the external load;
    a support spring disposed within the opening of the electromagnetic element, said support spring restraining said armature from upward movement; and
    at least one lower spring, said lower spring contacting said armature and restraining the armature from downward movement;
    wherein applying current to the coil in the electromagnetic element causes the armature to move toward the electromagnetic element, and interrupting the current to the coil in causes the armature to move away from the electromagnetic element.

8. An electromagnetic actuator in accordance with claim 7 further comprising a shaft, said shaft connecting said armature element to the external load.

9. An electromagnetic actuator in accordance with claim 7 further comprising a case having an upper support and a lower support, said case surrounding said electromagnetic element, said armature element, and said springs, and further wherein said lower spring contacts the lower support of the case.

10. An electromagnetic actuator in accordance with claim 9 further comprising:
a reaction mass, said reaction mass being mounted intermediate said support spring and said upper support; and
at least one upper spring extending from and contacting said reaction mass and said upper support, wherein the compression and extension of the support spring drives the reaction mass 180 degrees out-of-phase with the moving armature element.

11. An electromagnetic actuator in accordance with claim 7 wherein said electromagnetic element and said armature are annular in horizontal cross-section.

12. An electromagnetic actuator in accordance with claim 7 wherein two lower springs are used, each of said two springs being disposed on opposing sides of the opening of the armature element.

13. An electromagnetic actuator in accordance with claim 10 wherein two upper springs are used, each of said two upper springs being disposed on opposing sides of the support spring.

* * * * *